United States Patent [19]

Wen

[11] Patent Number: 4,994,941
[45] Date of Patent: Feb. 19, 1991

[54] SIGN OF CHARACTER AND FIGURE

[76] Inventor: Hung-Sheng Wen, 5F, No. 87, Sung Chiang Rd., Taipei, Taiwan, 10428

[21] Appl. No.: 292,994

[22] Filed: Jan. 3, 1989

[51] Int. Cl.$^5$ ............................................. G01D 11/26
[52] U.S. Cl. ....................................... 362/26; 362/27; 362/31; 362/330; 362/244; 40/546
[58] Field of Search ............... 362/26, 27, 31, 244, 362/330; 40/546

[56] References Cited

U.S. PATENT DOCUMENTS

| | | | |
|---|---|---|---|
| 3,131,670 | 5/1964 | Hardesty | 362/27 |
| 4,009,535 | 3/1977 | Stock | 40/546 |
| 4,729,185 | 3/1988 | Baba | 40/546 |
| 4,777,749 | 10/1988 | Leo, Sr. | 40/546 |
| 4,874,228 | 10/1989 | Aho et al. | 362/26 |

FOREIGN PATENT DOCUMENTS 164393 12/1933 Switzerland .................. 40/546

Primary Examiner—James C. Yeung
Attorney, Agent, or Firm—Cushman, Darby & Cushman

[57] ABSTRACT

A sign of character and figure which, in addition to using the AC power supply, is particularly suitable for use with a solar energy means, comprising a solar cell for supplying the electrical energy converted from the solar energy; a battery means for receiving the electrical energy from the solar cell and supplying the stored electrical energy; a circuit means for automatically illuminating the character and figure display in the dark; a lighting means comprising a light bulb or light emitting diode as the light source; a very thin refracting plate wound within the body, the outer surface thereof having strips which are serrated at right angle and the inner surface being a smooth face through which the light from the light source is refracted into extremely uniform light rays to be emitted from the outer surface; the body comprising on the surface a figure display having a plurality of figures, each being composed of seven segments of " ", the desired figure being produced by means of strip shaped shades, and the body further comprising a character display with dots arranged in matrix, each dot comprising a large and a small holes with a " " shaped shade disposed therebetween for producing the desired character.

15 Claims, 3 Drawing Sheets

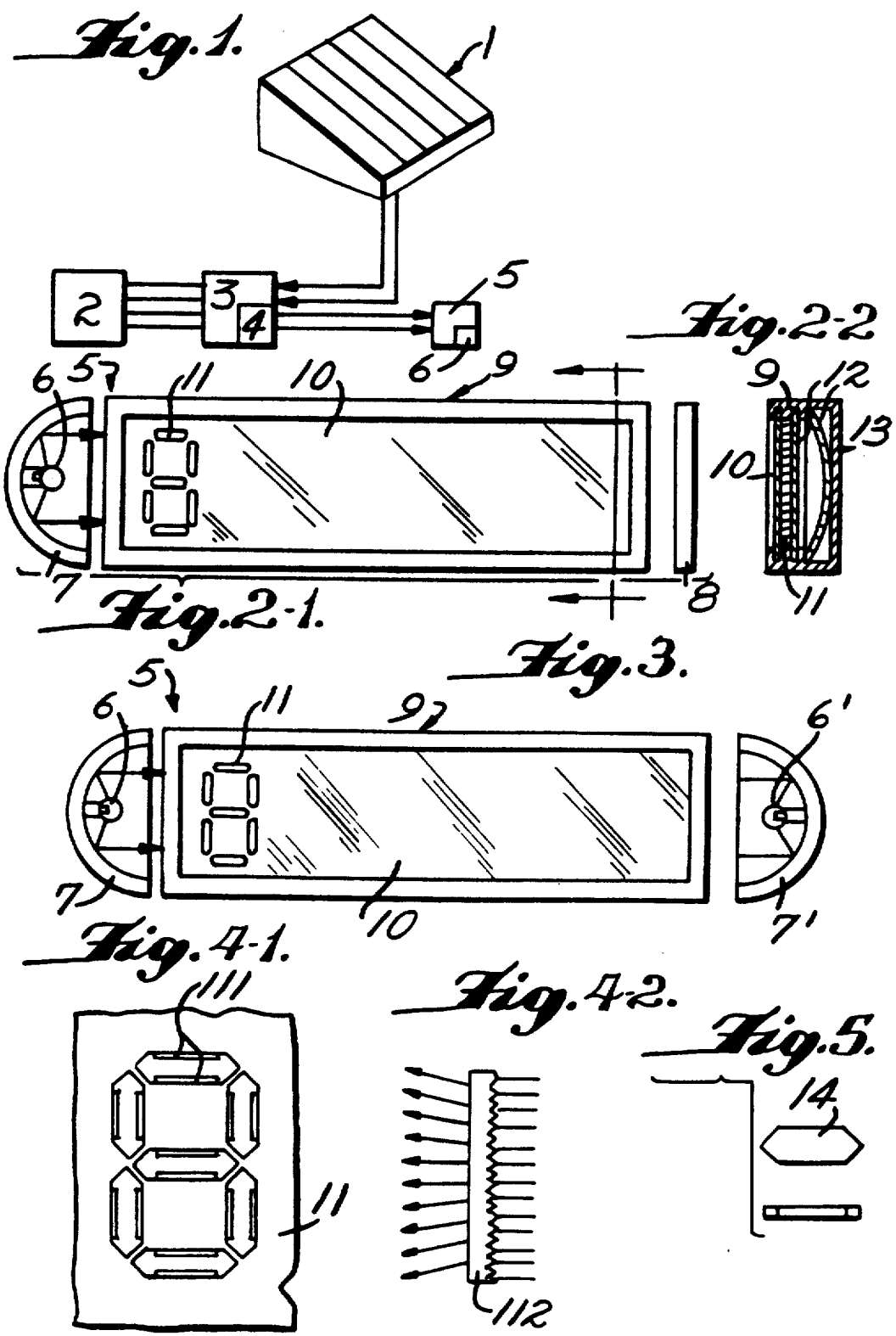

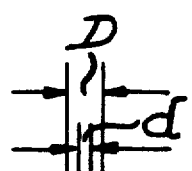
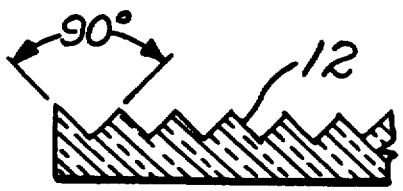
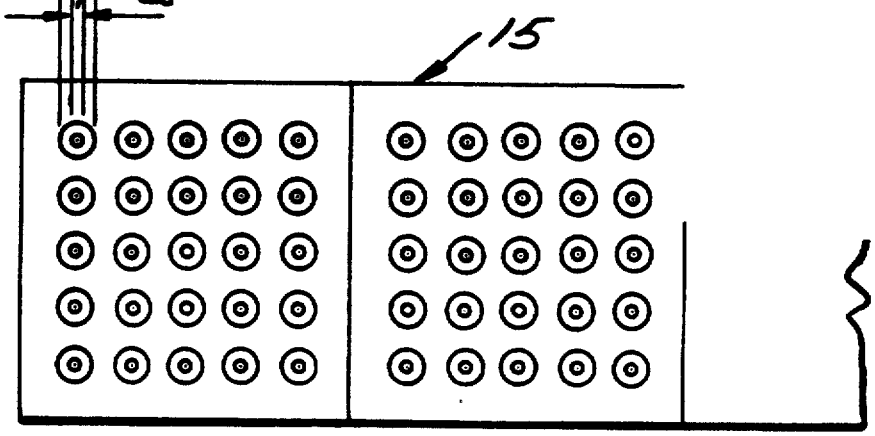
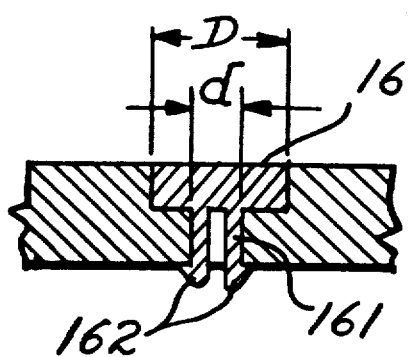
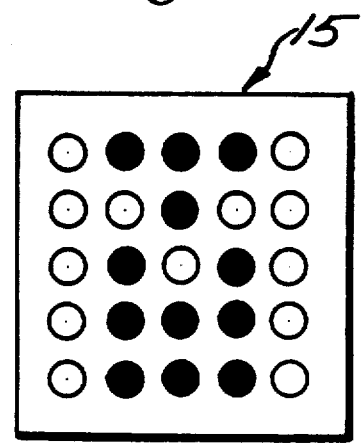

SIGN OF CHARACTER AND FIGURE

BACKGROUND OF THE INVENTION

The solar energy is an effective source of energy. Even in areas where there is no sufficient sunshine, the solar energy can still be used for light emitting means which need only low power (in places with sufficient sunshine, there is no problem at all). In addition to using the AC power source, the present invention is particular suitable for using the electrical energy converted from the solar energy which, through the control of a control circuit, automatically produces uniform and bright illuminating light with very low power for a character and figure display.

SUMMARY OF THE INVENTION

The object of the present invention is to provide a character and figure display which utilizes the solar energy; which needs only very low power for producing uniform and bright illuminating light by means of multi-refraction of a refracting plate; which carries out highly effective automatic character and figure display during the night through the control of a control circuit and changes the character and figure display by means of a few strip shaped shades and "※" shaped shades; and which is simple in structure and economically efficient and practical for use. The present invention may also use the typical AC power supply for character and figure display with the same result.

DESCRIPTION OF THE DRAWINGS

FIG. 1 is a schematic view showing a preferred embodiment of the present invention:

FIG. 2-1 is a front elevation view showing an embodiment of the lighting means for displaying figures according to the present invention;

FIG. 2-2 is a side elevation view showing the body of the lighting means as shown in FIG. 2-1;

FIG. 3 is a front elevation view showing another embodiment of the lighting means for displaying figures according to the present invention;

FIG. 4-1 is an enlarged view showing, in detail, the lighting means for displaying figures according to the present invention;

FIG. 4-2 is a side elevation view showing the figures as shown in FIG. 4-1;

FIG. 5 is a front elevation view showing the strip shaped shade for the character and figure display of the present invention;

FIG. 6 is an enlarged view showing, in detail, the surface of the refracting plate in the lighting means of the present invention;

FIG. 7 is an enlarged view showing, in detail, the lighting means being used for the character display according to the present invention;

FIG. 8 is a side elevation view showing the "※" shaped shade for the character display;

FIG. 9 is a view showing an embodiment of the character displayed by the character display;

DETAILED DESCRIPTION

Figure 10:
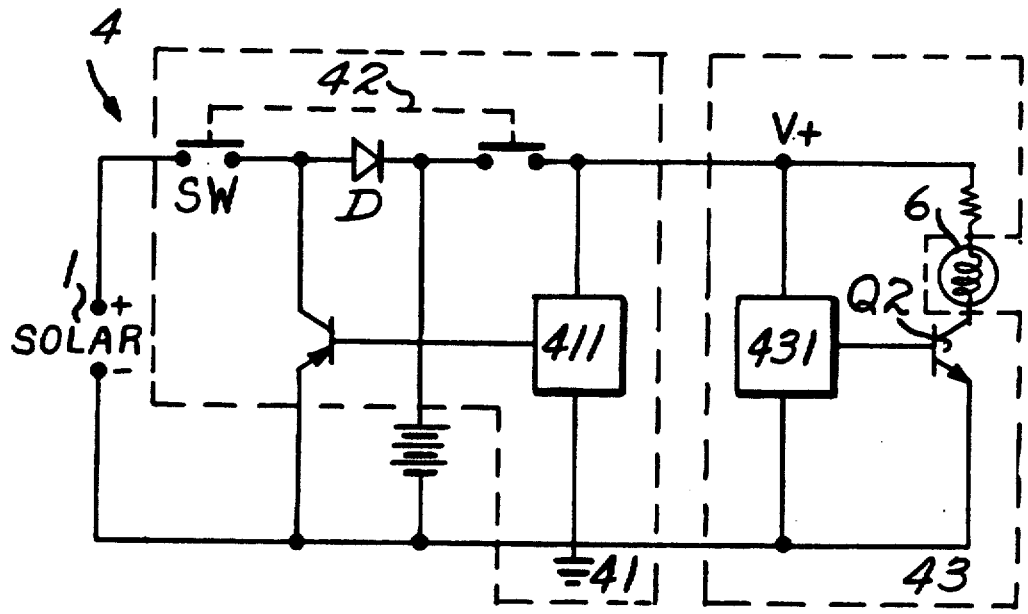
FIG. 10 is a block diagram of the control circuit in the character and figure display using a solar cell.

The preferred embodiment shown in FIG. 1 comprises a solar cell (1) for converting the solar energy into the electrical energy; a battery means (2) for receiving the electrical energy from the solar cell and supplying the stored the electrical energy; a circuit board means (3) comprising a control circuit (4) for automatically charging the battery means (2) when being irradiated by the sun rays and for automatically controlling a lighting means (5) to produce illuminating light during the night; and the lighting means (5) comprising a light bulb or a light emitting means as the light source (6) for illuminating the character and figure "弋".

Referring to FIG. 2-1, there is shown an embodiment of the lighting means for figure display according to the present invention which comprises a light source (6) such as a light bulb, a parabolic mirror (7) disposed on one end of a body (9) of the light means, said light source being placed at the focus of the parabolic mirror such that the light from the light source is reflected and emitted parallelly into the body to illuminate the display of the figure "8" (11)(the number of the figure displayed depends on the number of the door plate), a reflective mirror (8) being provided on the other side of the body for reflecting the incident light into the body, a transparent rectangular cover plate (10) pressing immediately over the figure "8" to hold them fixed. Alternatively, said parabolic mirror (7) may be replaced by reflecting mirror.

FIG. 2-2 is a side elevation view showing the body of the lighting means. There is shown a refracting plate (12) provided below the figures "8" within the body having an arcuate or flat cross-section. The light emitted from the light source (6) and reflected by the parabolic mirror (7) penetrates into the refracting plate (12) such that, by means of multi-refraction by the surface thereof (as shown in FIG. 6), uniform and bright light rays are produced for illuminating the figures. Below the refracting plate there is provided a substantially rectangular tin foil (13) for increasing the intensity of illumination of the figures, said tin foil may be replaced by vacuum plating the inner side of the lower portion of the body (not shown) for reflection purpose.

FIG. 3 shows another embodiment of the lighting means for displaying figures according to the present invention. There is shown another light source (6') which may be used to replace the reflecting mirror (8) on the other side of the body to intensify the light illumination.

As shown in FIG. 4-1, each figure "8" (11) has seven segments of which each is provided w a flange (111) on either side to be covered by non-transparent shade (14). By using one or more shades, different figures (0 to 9) can be displayed, as desired, by means of the illumination by the light there below in the body.

FIG. 4-2, shows the surface structure (112) of the figures (11), the surface below the figure "8" being corrugated in shape so that the light from within the body is multi-reflected to display the figures brightly (segments covered by the strip shaped shades will not be displayed such that the desired figures may be displayed clearly). The problem of uneven illumination with conventional signboard is thus solved.

FIG. 5 shows the configuration the strip shaped shades (14). Changing the display of the figures is enabled by simply placing one or more shades on the seven segments of the figure such that it is possible to display any one of the figures.

FIG. 6 shows the surface configuration of the refracting plate (12). Said plate is a very thin transparent plastic film made of "Scotchlamp Film" available from the Minnesota Mining and Manufacturing Company, the outer surface thereof having a multiplicity of parallel strips each being serrated at 90 degree and disposed parallel to the light from the light source, the inner surface being smooth through which the incident light will be emitted after multi-refraction at the outer surface such that the character and figure display of the present invention can be very evenly illuminated for bright display.

FIG. 7 shows an embodiment of the character display means (15) in the lighting means of the present invention, said character display means comprising a plurality of character display, each character being composed of a plurality of dots arranged in matrix (such as matrix of 6×6 or 7×7 dots), each of the dots having a large and a small holes of diameters D and d, respectively, such that the desired character can be displayed after having the holes at proper positions covered with the "光" shaped shades as shown in FIG. 8.

FIG. 8 is a side elevation view of the "光" shaped shade in the character display which is configured to be a round shade having an outer diameter slightly smaller than "D" and a pair of legs (161) with a combined diameter slightly smaller than "d", each leg having a barb which is inserted into the round hole for securing purpose.

FIG. 9 shows an embodiment of the display of the characters wherein the letter "M", for example, can be displayed by having the "光" shades (as shown by black dots) placed at proper positions in the character display means (15).

FIG. 10 shows that the control circuit means (4) is used in the solar cell of the character and figure display of the present invention wherein the solar cell (1) is used to convert the solar energy into electrical energy whenever the sun shines; a charging and protecting circuit (41) coupled to said solar cell (1) and the battery (2) comprises a first comparator means (411) and a control transistor Q1, such that when the potential of the battery (2) is below a preset potential such as 4.4 V ±2.5%, the control transistor Q1 is caused to be in the "off" state under the condition where sunshine is present, thereby allowing the electrical energy converted by the solar cell (1) to be charged to the battery through a diode D; and when the potential of the battery is above said preset potential, the control transistor Q1 is in "on" state, thereby causing the converted electrical energy to be directly grounded through the control transistor Q1 so as to prevent the battery from being overcharged; a linked switch means (42) is disposed at the output of the solar cell and the battery, respectively, to prevent consuming electrical energy of the battery; an automatic light emission control circuit (43) comprises a second comparator means (431) having a photoresistor CDS, and an output transistor Q2 which, during the dark, is caused to be in the "on" state, thereby causing the light source (6) to produce light.

Figure 11:
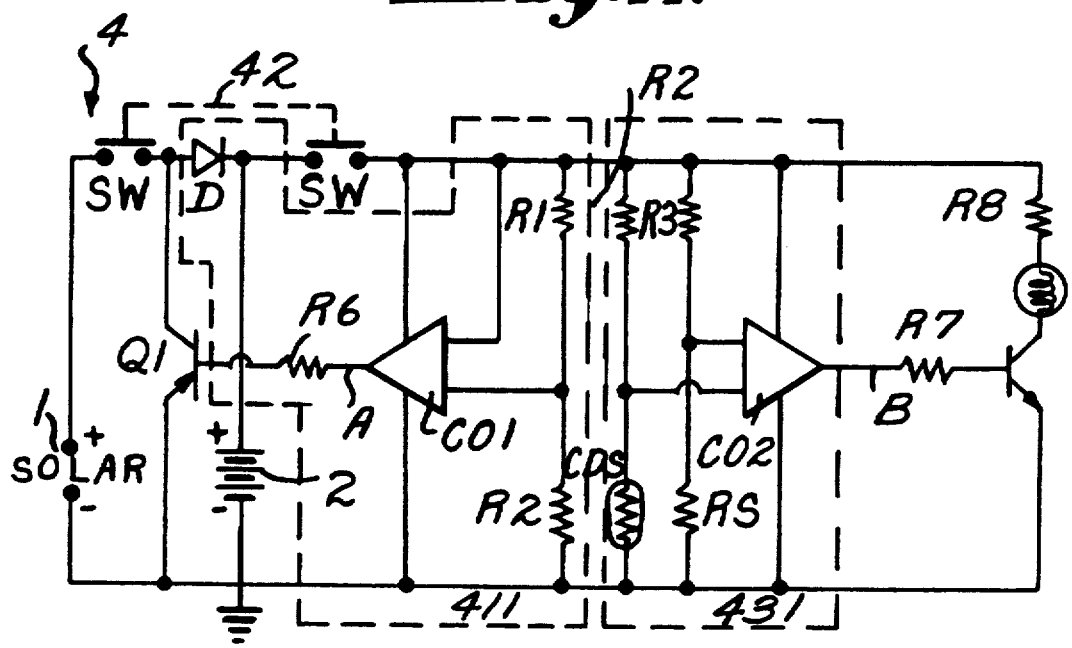
FIG. 11 is a detailed diagram of the circuit as shown in FIG. 10.

FIG. 11 is a detailed diagram of the circuit as shown in FIG. 10 which functions as follows:

The first comparator means (411) comprised in the charging and protecting circuit (41) is composed of a comparator COL, a diode D, and resistors R1 and R2, such that when the potential of the battery (2) is above a preset potential such as 4.4 V ±2.5% and the output A of the comparator CO1 is at high potential, a positive bias is provided through R6, causing the control transistor Q1 to be in the "on" state, the electrical energy from the solar cell (1) is directly grounded through Q1 without overcharging, and thus protecting, the battery. When the potential is below 4.4 V ±2.5%, the comparator CO1 is OFF, and A is becoming to be at low potential, then Q1 is in "off" state, thus allows the electrical energy converted by the solar cell when sunshine is present to be charged to the battery through the diode D. The second comparator means (431) comprised in the automatic light emission control circuit (43) is composed of a comparator CO2, resistors R3, R4,R5, and a photoresistor CDS. When the ambient light is too dim, CDS becomes to have high resistance, the comparator CO2 is ON, and the output B becomes to be at high potential, a positive bias is supplied to the output transistor Q2, causing Q2 to be in "on" state such that current is switched on for the light source (6) to automatically emit light. When CDS becomes to have low resistance as the ambient light is bright, the comparator CO2 is OFF, and the output B thereof becomes to be at low potential, then Q2 can not be triggered to be in the "on" state and the light source will no emit light.

With the control circuit means used in the solar energy type character and figure display, there are the following advantages:

1. When the potential of the battery is sufficient high, overcharge of the battery is limited so as to maintain the service life thereof;
2. Even if the weather is bad and sunshine is not available for extended period of time for charging the battery, the control circuit means of the present invention will automatically charge the battery whenever the sun begins to shine.
3. The control circuit means will cause the solar energy character and figure display to emit light automatically when the sky is getting dark and to shut off the character and figure display, also automatically, when it is becoming bright.

The power supply of the present invention, such as the solar cell means (comprising the solar cell (1), the battery means (2) and the circuit board (3)) or the AC power supply and the lighting means (5) may be combined together or disposed separately.

It is apparent that with the present invention, following advantages can be obtained:

(1) By way of the refracting plate, the configuration of the inner surface of the figure " " and the dot display of the characters, the desired characters and figures can be uniformly and effectively displayed with minimal power supply such that, in addition to pedestrians, they can be easily identified by drivers and postmen.
(2) With the changeable character and figure plate, the user can make changes as desired for the characters and figures to be displayed with minimal strip shaped shades and "負" shaped shades such that not only the manufacturing cost is reduced but it is convenient to use and may still be usable even the user has moved to another place.
(3) In addition to AC power supply, the present invention is also particularly suitable for use with the solar energy. Since only very low power is required, the present invention can be used even in areas where no sufficient sunshine is available, and in the present invention there is provided a control circuit, thus enabling automatic charging of the battery and automatic illumination of the character and figure display during the night with maximal efficiency.

What is claimed:

1. A display for displaying figures and characters, comprising:
   a power supply;
   a lighting arrangement body;
   a light source, powered by the power supply, disposed on one end of the lighting arrangement body;
   a reflecting mirror disposed on the other end of the lighting arrangement body for reflecting light from the light source;
   a parabolic mirror disposed such that the light source is positioned at the focus thereof and such that light from the light source is reflected and emitted parallel into the body;
   display means for displaying figures and characters;
   a transparent rectangular cover plate pressing on the display means; and
   a thin refractive plate of arcuate cross-section provided within the lighting arrangement body, and outer surface thereof below the display means having a multiplicity of parallel strips each being serrated at 90 degrees and disposed parallel to light from the light source, an inner surface being smooth for light from the light source to be multi-reflected to product uniform and bright illuminating light for displaying the figures.

2. A figure display, comprising:
   a power supply;
   a body;
   a light source disposed on one end of said body element;
   a reflecting mirror disposed on the other end of the of the lighting means for reflecting body light from the light source;
   a parabolic mirror, the light being disposed at the focus of the parabolic mirror such that the light for the light source is reflected and emitted parallelly into the body;
   a plurality of "8" shaped figures, each being composed of seven segments of which each is provided with a flange on either side, the inner surface thereof being corrugated in shape for the light to be multireflected;
   a plurality of strip shaped shades for covering the figure "8" at the appropriate sections so as to display the desired figures;
   a transparent rectangular cover plate pressing on said figures for securing purpose;
   a very thin refractive plate of arcuate cross-section provided within the body of the lighting means, an outer surface thereof below said figures having a multiplicity of parallel strips each being serrated at 90 degree and disposed parallel to the light from the light source, an inner surface being smooth for the light from the light source to be multi-refracted to produce uniform and bright illuminating light for displaying the figures.

3. The figure display as set forth in claim 2 wherein said power supply comprises a battery, and a control circuit such that the solar energy is converted into the electrical energy and automatically charges said battery and the light source is controlled to automatically emit light for illuminating the figure display.

4. The figure display as set forth in claim 2 wherein said power supply is AC power source.

5. The figure display as set forth in claim 2 wherein said parabolic mirror is a reflecting mirror.

6. The figure display as set forth in claim 2 wherein said reflecting mirror is a second light source and a second parabolic mirror, said light source being disposed at the focus of said second parabolic mirror.

7. The figure display as set forth in claim 2 further comprising a rectangular tin foil disposed within the body below the reflecting plate for reflecting the downwardly illuminated light, thus to intensify the display of the figures.

8. The figure display as set forth in claim 2 further comprising a vacuum plated layer on the inner surface within the body for reflecting the downwardly illuminated light, thus to intensify the display of the figures.

9. A character display, comprising:
   a power supply;
   a body; being serrated at 90 degree and disposed parallel to the light from the light source, an inner surface being smooth for the light from the light source to be multi-refracted to produce uniform and bright illuminating light for displaying the characters.

10. The character display as set forth in claim 9 wherein said power supply comprises a solar cell, a battery means, and a control circuit so that the solar energy is converted into the electrical energy and automatically charged to said battery means and that the light source is controlled to automatically emit light for illuminating the character display.

11. The character display as set forth in claim 9 wherein said power supply is AC power source.

12. The character display as set forth in claim 9 wherein said parabolic mirror is a reflecting mirror.

13. The character display as set forth in claim 9 wherein said reflecting mirror is a second light source and second parabolic mirror (7'), said light source being disposed at the focus of said second parabolic mirror (7').

14. The character display as set forth in claim 9 further comprising a rectangular tin foil disposed within the body below the reflecting plate for reflecting the downwardly illuminated light, thereby to intensify the display of the characters.

15. The character display as set forth in claim 9 further comprising a vacuum plated layer on the inner surface within the body for reflecting the downwardly illuminated light, thus to intensify the display of the characters.

* * * * *